Figure 1:
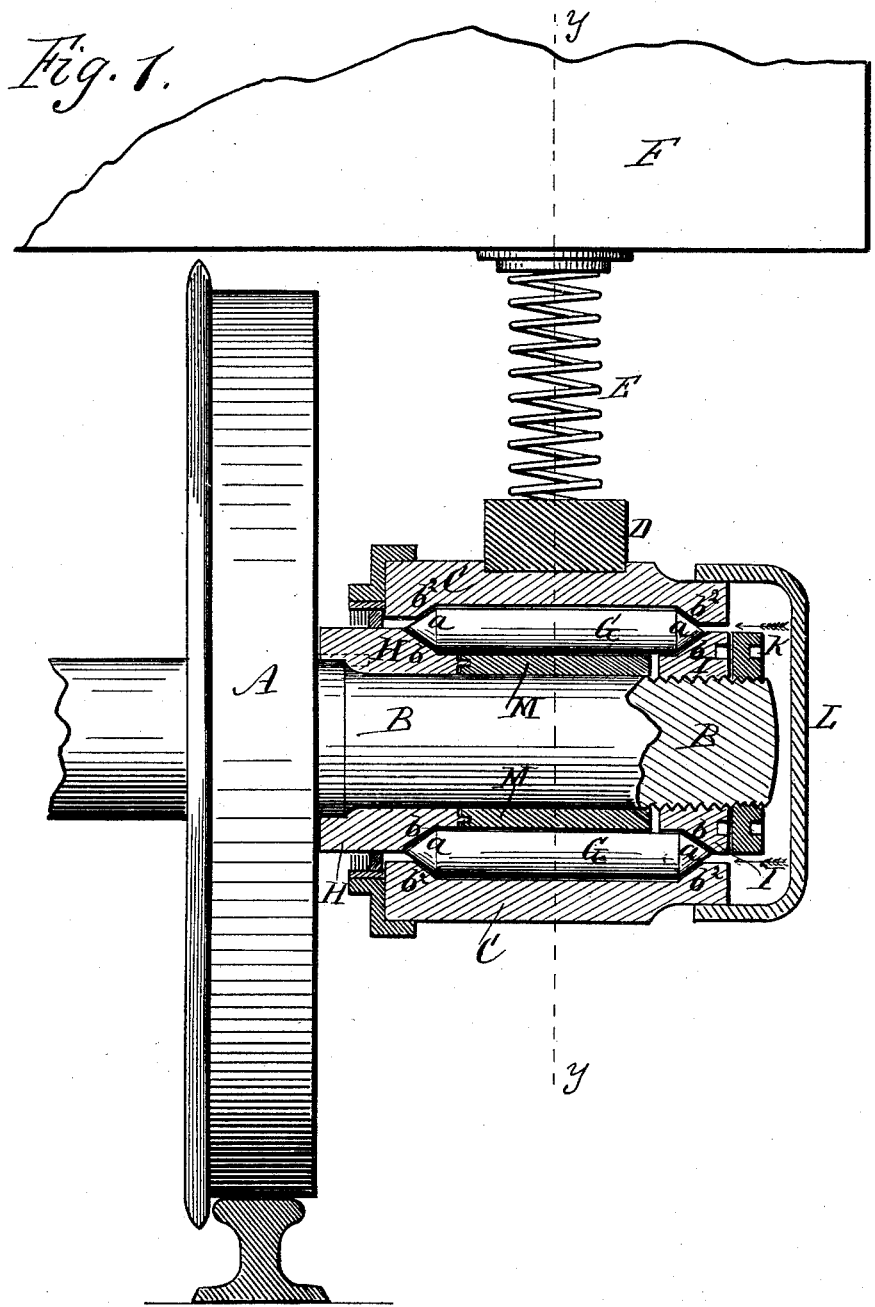

(No Model.) 2 Sheets—Sheet 1.
H. B. WILLIAMS.
ANTI-FRICTION BEARING FOR CAR AXLES.

No. 477,037. Patented June 14, 1892.

Witness
Chas. H. Evidener.
F. B. Hutchinson.

Inventor
Henry B. Williams,
Per R. F. Osgood, Attorney

THE NORRIS PETERS CO., PHOTO-LITHO., WASHINGTON, D. C.

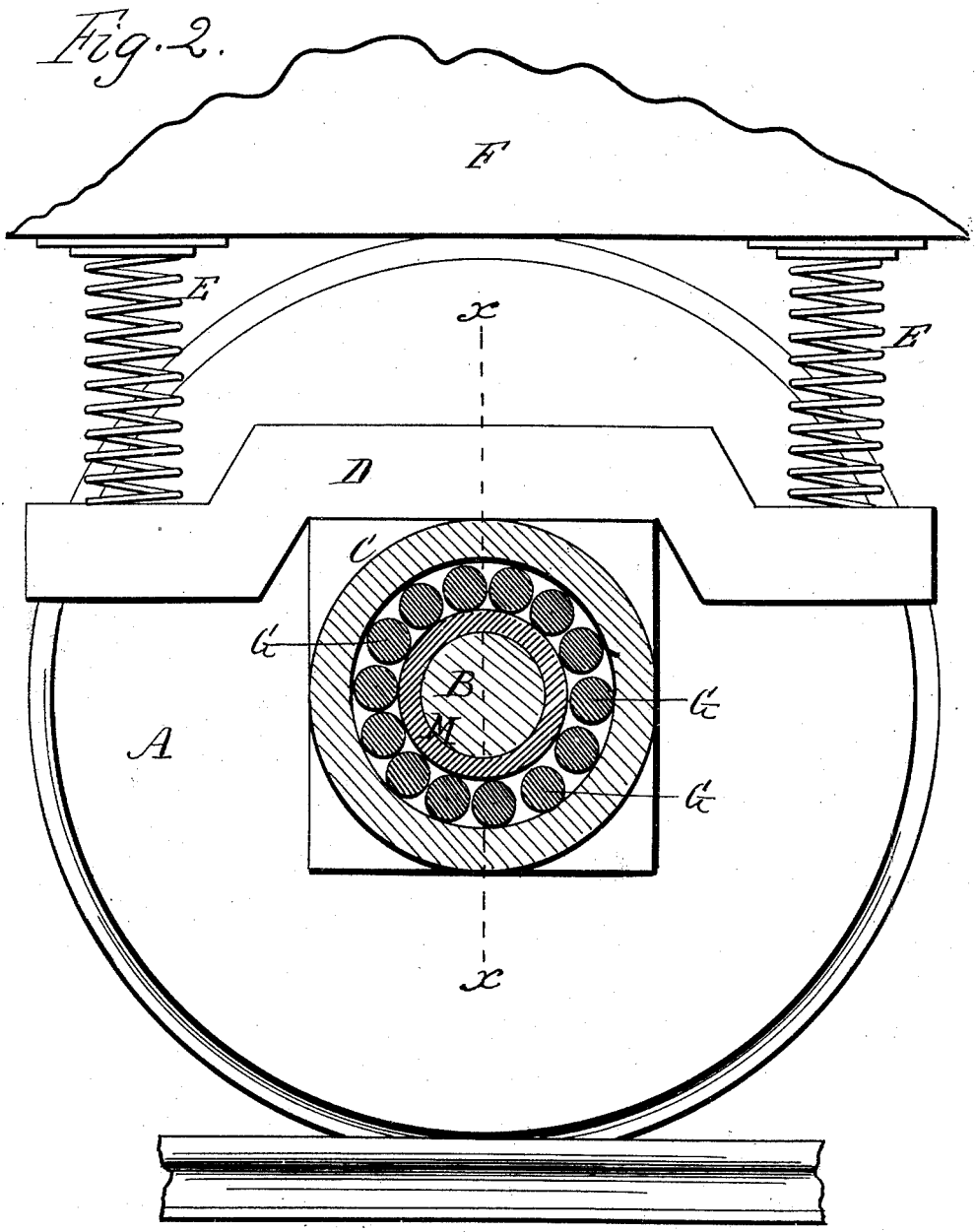

United States Patent Office.

HENRY B. WILLIAMS, OF ROCHESTER, NEW YORK, ASSIGNOR OF ONE-HALF TO LEMUEL A. JEFFREYS, OF SAME PLACE.

ANTI-FRICTION BEARING FOR CAR-AXLES.

SPECIFICATION forming part of Letters Patent No. 477,037, dated June 14, 1892.

Application filed March 12, 1892. Serial No. 424,639. (No model.)

*To all whom it may concern:*

Be it known that I, HENRY B. WILLIAMS, of Rochester, in the county of Monroe and State of New York, have invented a certain new and useful Improvement in Anti-Friction Bearings for Axles and Journals; and I do hereby declare that the following is a full, clear, and exact description of the same, reference being had to the drawings accompanying this specification.

My improvement relates to roller-bearings for journals and axles, and is designed more particularly for car-journals, although it is applicable to lighter vehicles.

The invention consists in the construction and arrangement hereinafter described, whereby the rollers are sustained in the middle of their length and are also capable of end adjustment to compensate for wear.

In the drawings, Figure 1 is a longitudinal section, partially in elevation, the section being taken in line $x$ $x$ of Fig. 2. Fig. 2 is a vertical cross-section in line $y$ $y$ of Fig. 1.

A indicates one of the car-wheels, and B the axle.

C is the box on which rests the tie-bar D.

E E are springs supporting the car-body F.

G G are the rollers arranged in a circle around the axle and resting between the axle and the box. These rollers differ from ordinary rollers of the kind by having conical ends $a$ $a$, the object of which is to allow end adjustment to compensate for wear, as will presently be described.

H is a sleeve resting closely around the axle next to the wheel and provided with a bevel $b$, that receives the corresponding bevel of the end of the rollers.

I is a corresponding sleeve at the outer end of the axle, forming a nut that screws upon the axle and provided with a bevel $b'$, similar to the other, that fits the outer bevel of the rollers. The box C has corresponding bevels $b^2$ $b^2$. The bevels of the several parts form regular miters, by which means there is no rubbing friction between them.

By the means above described the rollers can be tightened in place to compensate for wear by simply turning up the nut I, thereby obviating the loose action that occurs in common rollers, where no provision of this kind is made. To allow such adjustment, the ends of the rollers must be beveled and a nut or other movable follower must be employed. The nut is held from turning back by means of an outer jam-nut K, that turns upon a left-handed thread at the end of the axle.

L is a cap or cover at the end of the box for excluding dirt.

M is a sleeve resting around the axle between the two end sleeves H I and closing the space between them, except at the outer end, where a small space is left, as shown, to allow proper inward movement of the sleeve I to compensate for wear and tighten the rollers. This intermediate sleeve fills the space between the axle and the rollers and serves to sustain the rollers in the center and counteract any springing action of the latter under heavy weight.

I am aware that roller-bearings have before been used in hubs and boxes; but ordinarily they are square ended, and no provision is made for end movement to compensate for wear. By making them conical at the ends and providing a follower such end movement can be made, thus compensating for wear, which is essential, especially in heavy vehicles. Furthermore, the central sleeve or washer M is necessary to prevent springing of the rollers.

Having described my invention, what I claim as new, and desire to secure by Letters Patent, is—

1. The combination, with the axle A and box C, of the sleeves H I on the axle, the sleeve I forming a nut, and the rollers G G, provided with conical ends $a$ $a$, which rest on corresponding bevels $b$ $b$ $b^2$ $b^2$, as shown and described, and for the purpose specified.

2. The combination, with the axle and box, of the sleeves H I, the intermediate sleeve M, and the set of rollers G G, the rollers being provided with conical ends that rest between beveled ends of the box and sleeves, as and for the purpose specified.

In witness whereof I have hereunto signed my name in the presence of two subscribing witnesses.

HENRY B. WILLIAMS.

Witnesses:
R. F. OSGOOD,
P. A. COSTICH.